(12) United States Patent
Neag et al.

(10) Patent No.: US 11,613,170 B2
(45) Date of Patent: Mar. 28, 2023

(54) STOWABLE CHECK STRAP ASSEMBLY FOR VEHICLE DOOR

(71) Applicants: Dorinel Neag, Commerce Township, MI (US); David Barnier, Jr., Clawson, MI (US); Dennis G Willyard, Orion, MI (US); Michael E Lafleur, Brighton, MI (US)

(72) Inventors: Dorinel Neag, Commerce Township, MI (US); David Barnier, Jr., Clawson, MI (US); Dennis G Willyard, Orion, MI (US); Michael E Lafleur, Brighton, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/412,566

(22) Filed: Aug. 26, 2021

(65) Prior Publication Data

US 2023/0061227 A1    Mar. 2, 2023

(51) Int. Cl.
*B60J 5/04* (2006.01)
*E05C 17/20* (2006.01)

(52) U.S. Cl.
CPC .......... *B60J 5/0468* (2013.01); *B60J 5/0486* (2013.01); *B60J 5/0487* (2013.01); *E05C 17/203* (2013.01)

(58) Field of Classification Search
CPC ...... B60J 5/0487; B60J 5/0468; B60J 5/0486; E05F 5/025; E05C 17/203; E05C 17/206
USPC .......................................................... 296/148
See application file for complete search history.

(56) References Cited

U.S. PATENT DOCUMENTS

| 4,070,056 | A  | * | 1/1978  | Hickman  | B60J 5/0487 49/501 |
| 5,862,570 | A  | * | 1/1999  | Lezuch   | E05C 17/085 292/262 |
| 5,924,170 | A  |   | 7/1999  | Papke et al. | |
| 6,438,794 | B2 | * | 8/2002  | Ng       | E05C 17/203 16/82 |
| 6,711,778 | B2 | * | 3/2004  | Sparkman | E05C 17/203 16/82 |
| 6,948,214 | B2 |   | 9/2005  | Spalding et al. | |
| 7,143,473 | B2 | * | 12/2006 | Matsuki  | E05C 17/206 16/86 B |
| 7,739,836 | B2 |   | 6/2010  | Keane et al. | |
| 8,066,320 | B1 |   | 11/2011 | Grabowski | |
| 8,556,330 | B2 |   | 10/2013 | Lazarevich et al. | |
| 8,567,012 | B2 | * | 10/2013 | Ng       | E05C 17/203 16/85 |

(Continued)

FOREIGN PATENT DOCUMENTS

DE    102010019621 A1    11/2011
EP        0151409 A1     8/1985

*Primary Examiner* — Jason S Morrow
(74) *Attorney, Agent, or Firm* — Ralph E. Smith

(57) ABSTRACT

A stowable check strap assembly for a vehicle having a body and a removable door. The assembly includes a bracket configured to rotatably couple to the vehicle body, and a check strap rotatably coupled to the bracket and configured to be operably and removably coupled with a door detent coupled to the removable door. The bracket is rotatable between a deployed position where the check strap is positioned to extend outwardly from the vehicle body and engage the door detent, and a stowed position where the check strap is positioned to be and is rotated toward the vehicle body for stowage thereof.

17 Claims, 5 Drawing Sheets

(56) References Cited

U.S. PATENT DOCUMENTS

| | | | | |
|---|---|---|---|---|
| 8,651,556 | B2* | 2/2014 | Cutting | E05D 3/145 |
| | | | | 296/146.12 |
| 8,919,858 | B2* | 12/2014 | Lee | E05C 17/20 |
| | | | | 296/146.1 |
| 9,003,604 | B2* | 4/2015 | Matsuki | E05F 5/025 |
| | | | | 16/86 C |
| 9,850,695 | B2* | 12/2017 | Torres Fernandez | E05F 5/00 |
| 10,519,701 | B2* | 12/2019 | Patterson | E05C 17/206 |
| 10,738,520 | B2 | 8/2020 | Cherry et al. | |
| 2007/0040392 | A1* | 2/2007 | Matsuki | E05C 17/206 |
| | | | | 292/262 |
| 2014/0059802 | A1* | 3/2014 | Matsuki | E05F 5/025 |
| | | | | 16/82 |
| 2018/0371813 | A1 | 12/2018 | Cherry et al. | |
| 2019/0010741 | A1* | 1/2019 | Youn | E05C 17/206 |
| 2019/0292818 | A1* | 9/2019 | Gumbo | E05C 17/003 |
| 2020/0079192 | A1* | 3/2020 | Getzschman | B60J 5/0476 |
| 2021/0131141 | A1* | 5/2021 | Rossi | E05C 17/203 |
| 2022/0001725 | A1* | 1/2022 | Moriyama | E05F 1/1091 |
| 2022/0243507 | A1* | 8/2022 | Moriyama | E05B 85/16 |

* cited by examiner

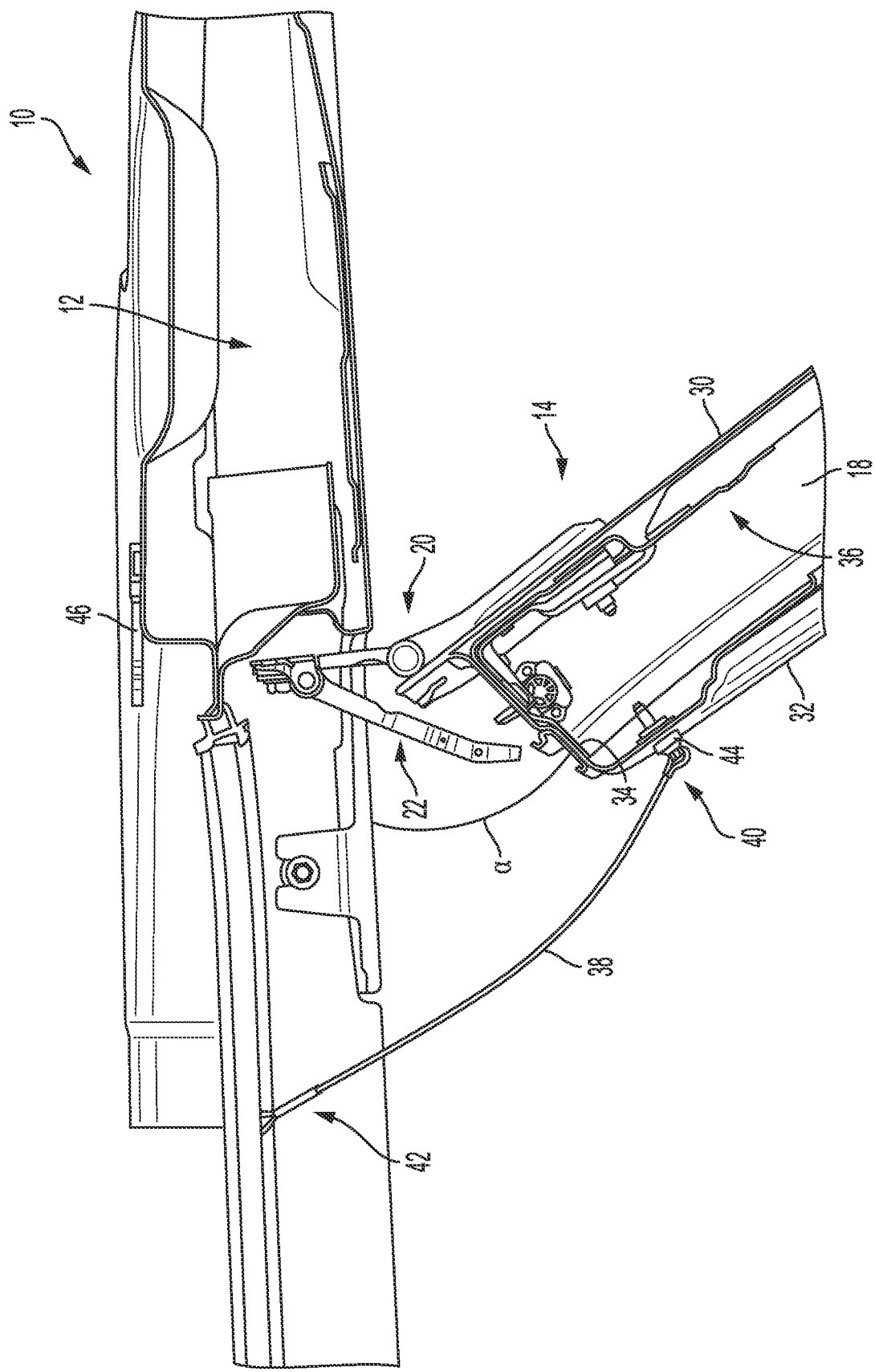

STOWABLE CHECK STRAP ASSEMBLY FOR VEHICLE DOOR

FIELD

The present application relates generally to vehicle door systems and, more particularly, to a stowable check strap assembly for removable vehicle door systems.

BACKGROUND

Some vehicles are provided with a roof and doors that a driver or passenger can quickly and easily remove to improve occupant enjoyment while driving. The removable doors may be provided with hinge assemblies that allow the door to be quickly and easily removed from the vehicle body to facilitate providing a pleasurable, open-air driving experience. However, removal of the doors may require tools, as well as removal of related components, which may make the removal and reattachment process difficult or time consuming. Therefore, while such conventional systems do work well for their intended purpose, it is desirable to provide continuous improvement in the relevant art.

SUMMARY

In accordance with one example aspect of the invention, a stowable check strap assembly for a vehicle having a body and a removable door is provided. In one example implementation, the assembly includes a bracket configured to rotatably couple to the vehicle body, and a check strap rotatably coupled to the bracket and configured to be operably and removably coupled with a door detent coupled to the removable door. The bracket is rotatable between a deployed position where the check strap is positioned to extend outwardly from the vehicle body and engage the door detent, and a stowed position where the check strap is positioned to be and is rotated toward the vehicle body for stowage thereof.

In addition to the foregoing, the described check strap assembly may include one or more of the following features: a biasing mechanism configured to bias the check strap into an installation position to guide the check strap back into the door detent when the door is reinstalled on the vehicle body; a stop pin configured to couple to the vehicle body and stop rotation of the bracket once in the deployed position; and a retaining clip configured to couple to the vehicle body to retain the check strap in the stowed positioned toward the vehicle body.

In addition to the foregoing, the described check strap assembly may include one or more of the following features: wherein the bracket includes a base member with a pair of laterally spaced apart strap flanges extending therefrom, wherein one end of the check strap is disposed between the strap flanges and rotatably coupled thereto; wherein the bracket further includes a pin rotatably coupling the check strap to the strap flanges; wherein the bracket includes a base member with a fastener flange extending therefrom, the fastener flange defining a fastener aperture configured to receive a fastener for rotatably coupling the bracket to the vehicle body; and wherein the check strap includes a distal end having a plurality of detents formed therein configured to facilitate holding the door in a plurality of predefined positions relative to the vehicle body.

In accordance with another example aspect of the invention, a vehicle is provided. In one example implementation, the vehicle includes a body, a removable door removably and rotatably coupled to the vehicle body, and a door detent coupled to the removable door. A stowable check strap assembly is configured to be operably coupled to the door detent. The check strap assembly is movable between a deployed position where the check strap assembly is positioned to extend outwardly from the vehicle body and engage the door detent, and a low-profile stowed position once the check strap assembly is detached from the door detent.

In addition to the foregoing, the described vehicle may include one or more of the following features: wherein the stowable check strap assembly includes a bracket rotatably coupled to the vehicle body, and a check strap rotatably coupled to the bracket and configured to be operably and removably coupled with the door detent, wherein the bracket is rotatable between the deployed position where the check strap is positioned to extend outwardly from the vehicle body and engage the door detent, and the stowed position where the check strap is positioned to be rotated toward the vehicle body for stowage thereof.

In addition to the foregoing, the described vehicle may include one or more of the following features: wherein the check strap assembly further comprises a biasing mechanism configured to bias the check strap into an installation position to guide the check strap back into the door detent when the door is reinstalled on the vehicle body; wherein the check strap assembly further comprises a stop pin coupled to the vehicle body and configured to stop rotation of the bracket once in the deployed position; wherein the check strap assembly further comprises a retaining clip coupled to the vehicle body and configured to retain the check strap in the stowed positioned toward the vehicle body; and wherein the bracket includes a base member with a pair of laterally spaced apart strap flanges extending therefrom, wherein one end of the check strap is disposed between the strap flanges and rotatably coupled thereto.

In addition to the foregoing, the described vehicle may include one or more of the following features: wherein the bracket further includes a pin rotatably coupling the check strap to the strap flanges; wherein the bracket further includes a fastener flange extending from the base member, the fastener flange defining a fastener aperture configured to receive a fastener for rotatably coupling the bracket to the vehicle body; wherein the check strap includes a distal end having a plurality of detents formed therein configured to facilitate holding the door in a plurality of predefined positions relative to the vehicle body; and a hook coupled to the vehicle body, and a soft check strap having a first end coupled to the door, and an opposite second end configured to removably couple to the hook to limit rotation of the door relative to the vehicle body.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 4 is a sectional plan view of the removable door system of FIG. 3 shown in a door removal position, in accordance with the principles of the present application;

DESCRIPTION

According to the principles of the present application, systems and methods are described for a stowable check strap assembly for a removable vehicle door system. The check strap assembly includes a check strap rotatably coupled to a bracket, allowing the check strap to be located for easy attachment to a door detent. The bracket is in turn rotatably coupled to the vehicle body. When the vehicle door is removed, the bracket is rotated to move the check strap to a vertical position where it can then be rotated toward the vehicle body to a low-profile, out of the way, and stowed position. Advantageously, no tools are required to remove or install the door, nor any additional steps to disengage the check strap assembly, such as actuating push buttons, levers, etc. Such a system rapidly speeds up the door removal and reattachment process.

Figure 1:
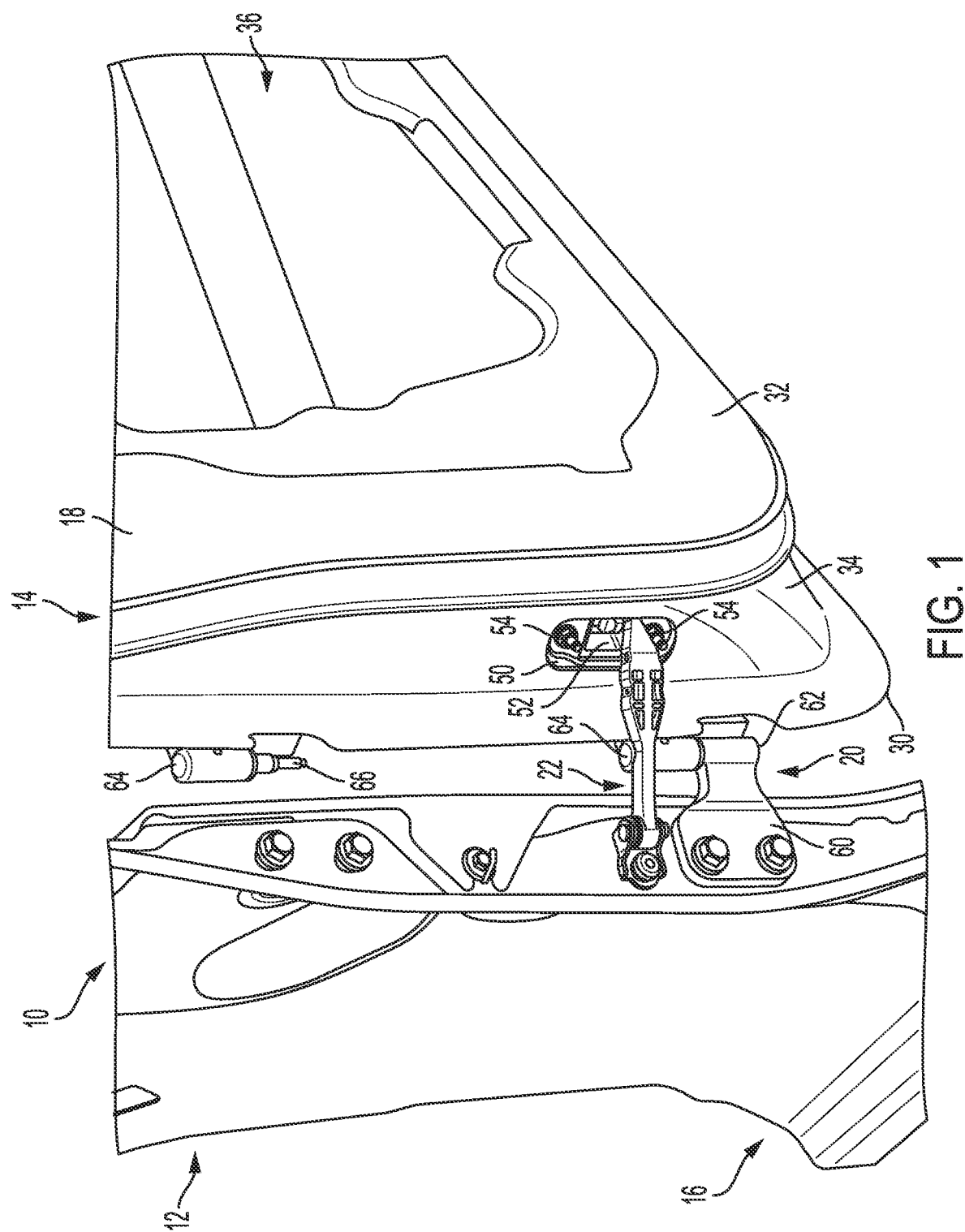
FIG. 1 is a perspective view of a vehicle with an example removable door system in a first position, in accordance with the principles of the present application.

With initial reference to FIG. 1, a vehicle 10 is illustrated having a body 12 with a removable door system 14 in accordance with the principles of the present disclosure. The removable door system 14 at least partially encloses and defines a passenger compartment 16 in which the vehicle driver and passengers sit during operation of the vehicle. In the example implementation, the removable door system 14 includes selectively removable doors 18 removably coupled to the vehicle body 12 by one or more door hinge assemblies 20. As described herein in more detail, each removable door 18 is operably associated with a stowable check strap assembly 22.

With reference now to FIGS. 1-4, the removable doors 18 will be described in more detail. In the example embodiment, vehicle 10 includes a pair of removable front doors and a pair of removable rear doors. It will be appreciated, however, that vehicle 10 can have any suitable number of doors, some or all of which include the stowable check strap assembly 22. For ease of discussion, only the front passenger side door will be described in detail, but it will be appreciated that any or all of removable doors 18 can be structurally and functionally identical or substantially similar thereto.

Figure 2:
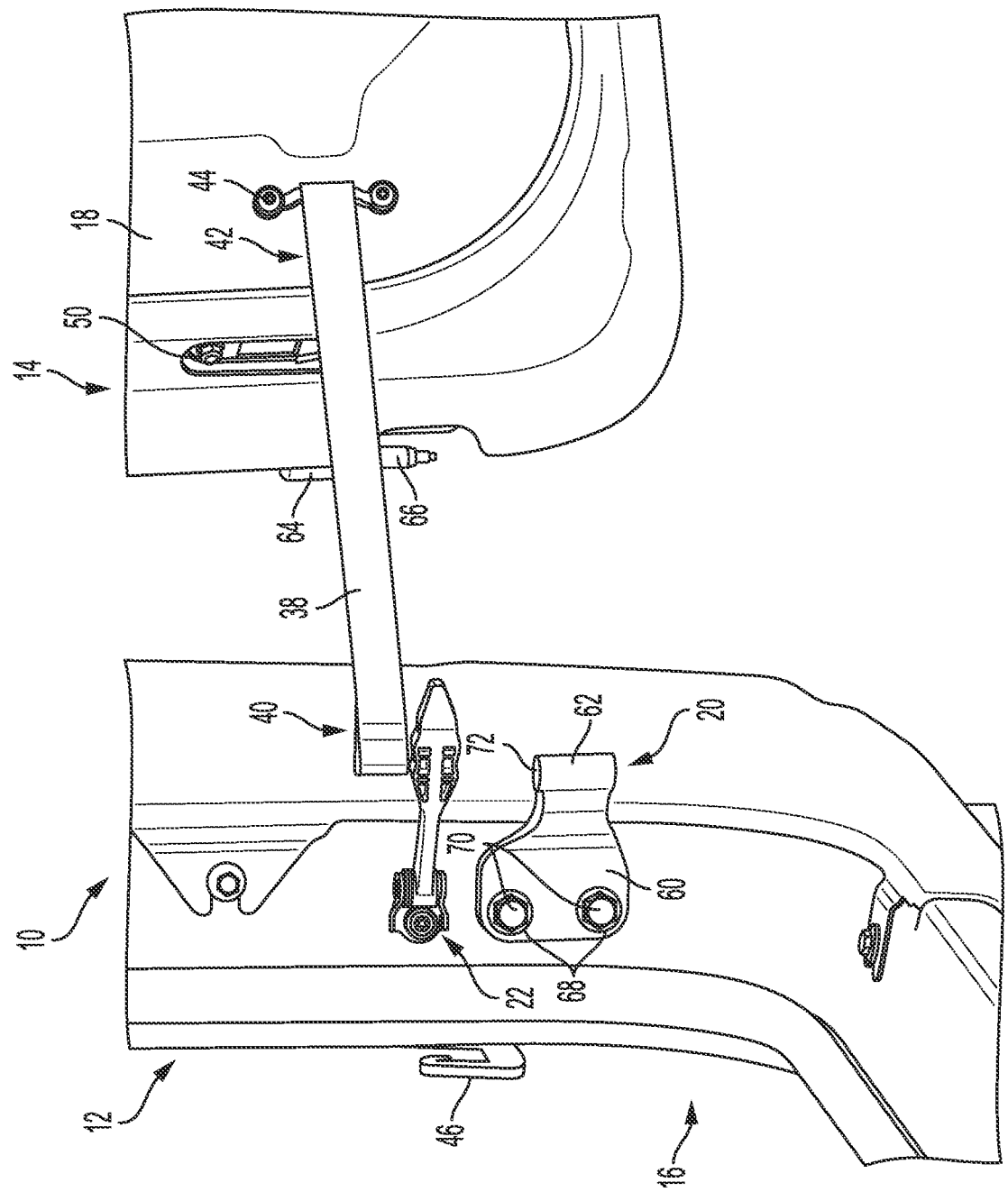
FIG. 2 is a perspective view of the removable door system of FIG. 1 shown in a second position, in accordance with the principles of the present application.
Figure 3:
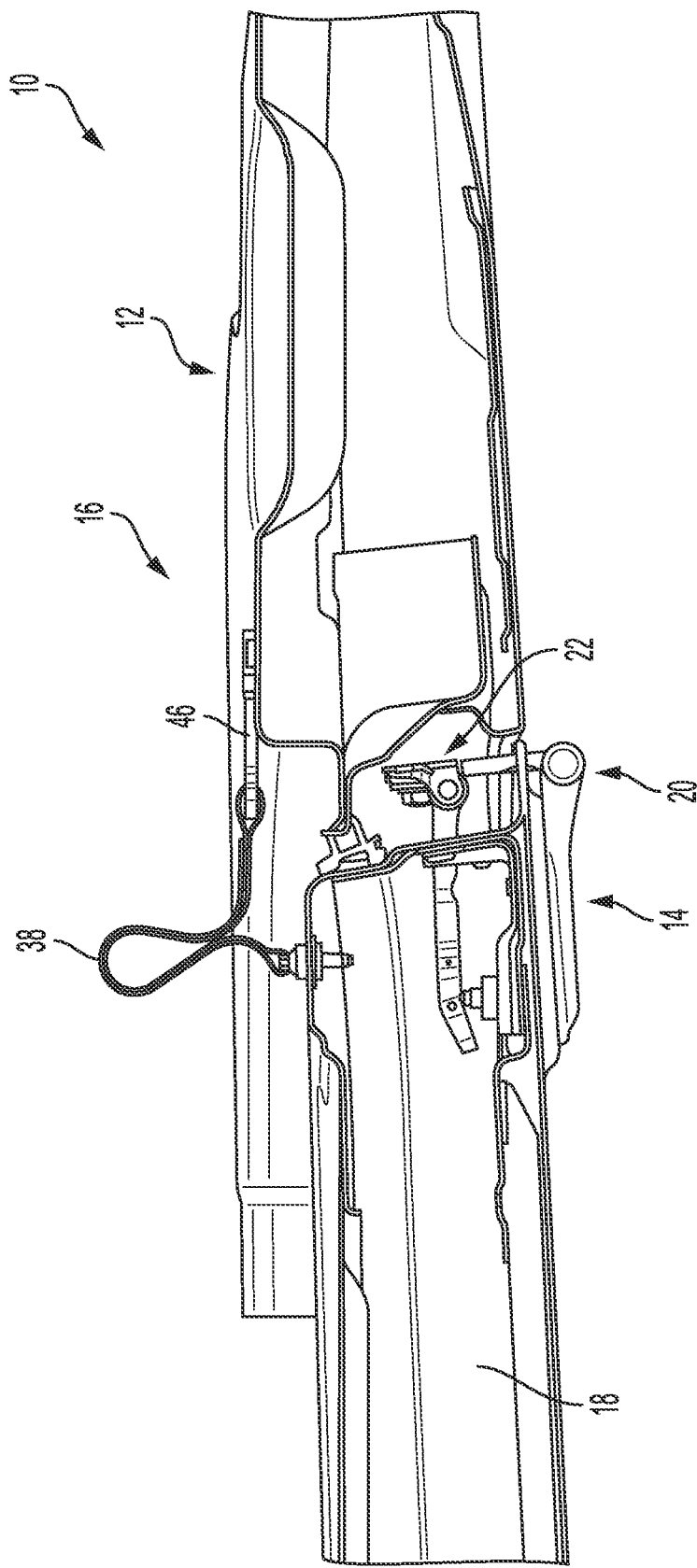
FIG. 3 is a sectional plan view of the removable door system of FIG. 1 in a door closed position, in accordance with the principles of the present application.

As shown in FIGS. 1-4, removable door 18 generally includes an exterior panel 30 (e.g., sheet metal), an interior panel 32, and a perimeter side wall 34 all at least partially defining an interior cavity 36 (e.g., see FIG. 3). The exterior panel 30 includes a portion of the hinge assembly 20, and the interior panel 32 is configured to receive one or more pieces of interior trim (not shown). Additionally, removable door 18 includes a soft check strap 38 (e.g., nylon strap) having a first end 40 and an opposite second end 42. The soft check strap 38 is configured to limit maximum rotation of the door 18 relative to the vehicle body 12 when rotatably coupled thereto. The first end 40 is coupled to the interior panel 32 via a fastener 44, and the second end 42 is looped for removably coupling to a footmans loop or hook 46 of the vehicle body 12 to thereby limit maximum door rotation (e.g., 90°).

In the example embodiment, the side wall 34 defines a check strap aperture 50 configured to receive one or more portions of the stowable check strap assembly 22 therethrough, as described herein in more detail. A door detent 52 is configured to couple to an inner side of the side wall 34 via one or more fasteners 54. In this way, the door detent 52 is disposed within the door interior cavity 36 over the check strap aperture 50. The stowable check strap assembly 22 is operably and removably coupled with the door detent 52 to provide one or more checks or detents to retain the door 18 in one or more predefined open positions relative to the vehicle body 12. In general operation, the door 18 remains stationary in each detent position until a user applies force sufficient to move the door 18 away from the detent position. Advantageously, in the example implementation, the stowable check strap assembly 22 is removably coupled to the door detent 52 to enable the user to remove the door 18 from the vehicle body 12.

With continued reference to FIGS. 1 and 2, the door hinge assemblies 20 will be described in more detail. In the example embodiment, the door hinge assemblies 20 enable the removable doors 18 to pivot between a closed position and an open position to allow a user of the vehicle 10 to enter and exit the passenger compartment 16. Further, the door hinge assemblies 20 are configured to enable a user to quickly and easily remove the door 18 from the body 12 of the vehicle 10 without any tools, or in alternative examples, using only simple tools such as a wrench, screwdriver, hex key, or other tool that may be conveniently stored within the vehicle 10. In this way, the user may quickly and easily remove the entire door 18 from the body of the vehicle 10.

As shown in FIG. 2, in the example implementation, each hinge assembly 20 is comprised of a leaf 60 having a first knuckle 62, a second knuckle 64, and a door pin 66. The leaf 60 includes a plurality of apertures 68 configured to receive fasteners 70 for coupling the leaf 60 to the vehicle body 12. Alternatively, leaf 60 may be attached to body 12 by any suitable means such as, for example, via welding. The first knuckle 62 is coupled to or integrally formed with the leaf 60 and is a tubular, substantially cylindrical member defining a receiving aperture 72 extending therethrough.

The second knuckle 64 is coupled to or integrally formed with the removable door 18 and is also a substantially cylindrical member. The door pin 66 is coupled to a lower end of the second knuckle 64 and extends downwardly therefrom. As shown in FIG. 1, the first and second knuckles 62, 64 are configured to be aligned such that the door pin 66 can be inserted through receiving aperture 72. In some examples, a retaining member (e.g., a nut, not shown) may then be coupled to a bottom end of the door pin 66 to hingedly secure the door 18 to the vehicle body 12.

Figure 6:
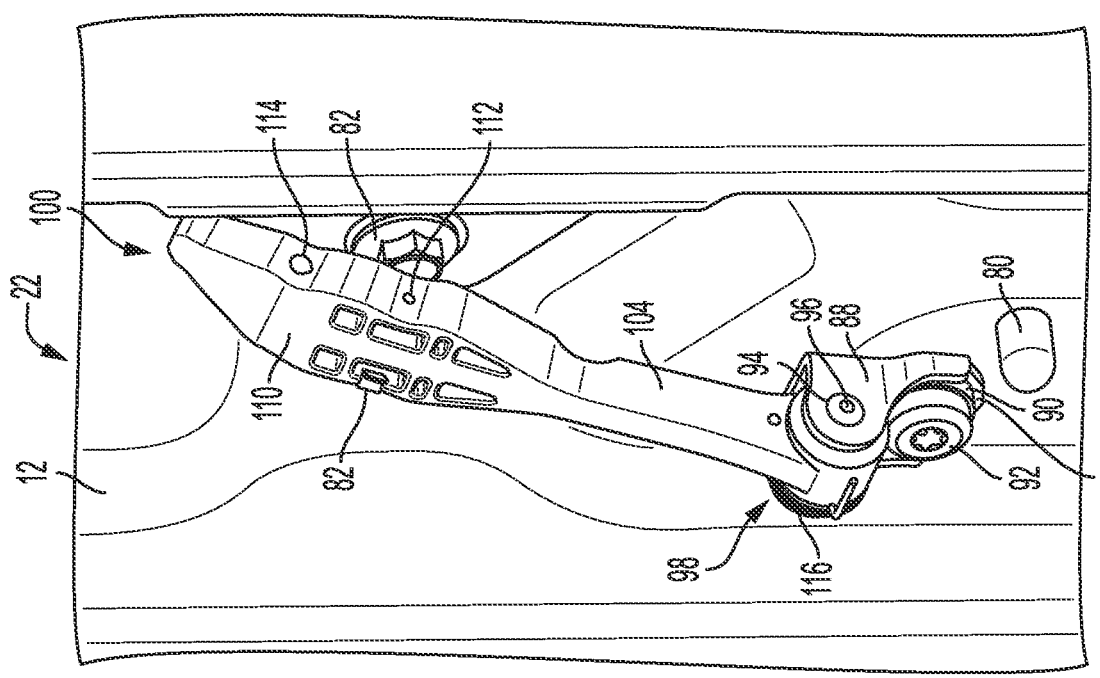
FIG. 6 is a perspective view of the stowable check strap assembly of FIG. 5, shown in a stowed position, in accordance with the principles of the present application.
Figure 5:
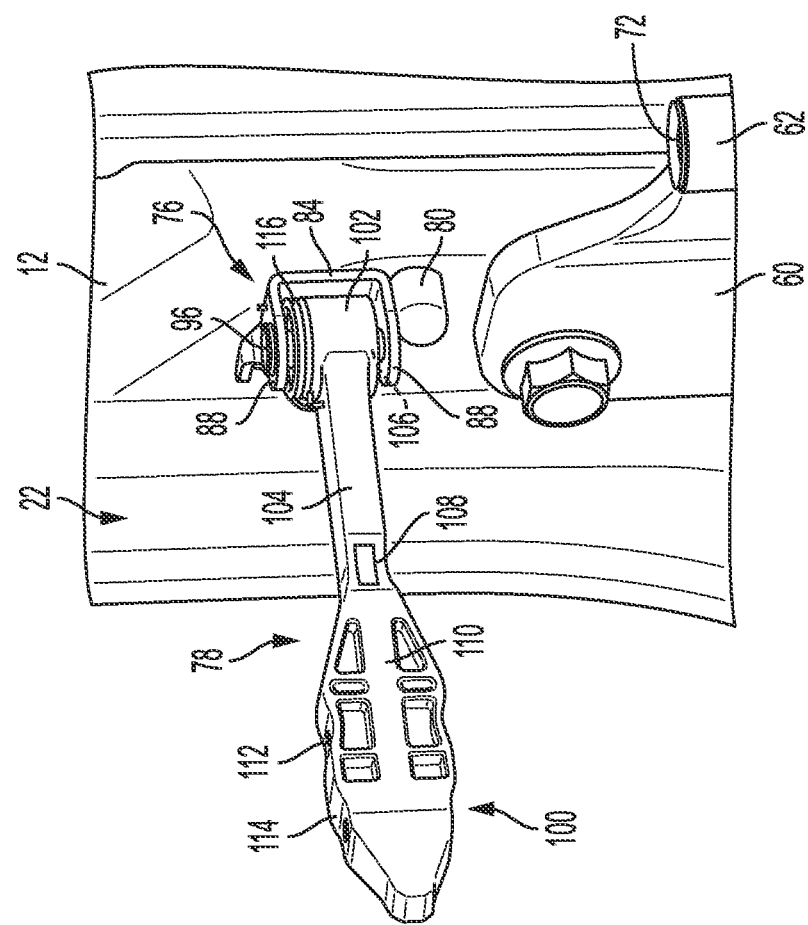
FIG. 5 is an enlarged view of an example stowable check strap assembly of the removable door system in FIG. 1, shown in a deployed position, in accordance with the principles of the present application.

Turning now to FIGS. 5 and 6, the stowable check strap assembly 22 will be described in more detail. In the example embodiment, the stowable check strap assembly 22 generally includes a bracket 76, a check strap 78, a stop pin 80, and a retaining clip 82. As described herein in more detail, the stowable check strap assembly 22 is movable between a deployed position (FIG. 5) and a stowed position (FIG. 6). This enables the check strap assembly 22 to be positioned for coupling with the door 18 when desired, and subsequently moved out of the way to the stowed position when the door 18 is removed from the vehicle body 12. In this way, the check strap assembly 22 can simply be moved to a stowed position and does not require removal from the body 12, thereby speeding up the door removal process.

In the illustrated example, bracket 76 generally includes a base member 84 with a fastener flange 86 and a pair of laterally spaced apart strap flanges 88 extending therefrom. The fastener flange 86 defines a fastener aperture 90 configured to receive a fastener 92 (e.g., a bolt) for rotatably coupling the bracket 76 to the fastener 92 and/or vehicle body 12. This enables the bracket 76 to be rotated between a cross-car or transverse position (FIG. 5) and a vertical position (FIG. 6), as described herein in more detail. The strap flanges 88 each include a pin aperture 94 configured to receive a pin 96 therethrough for rotatably coupling the check strap 78 to the bracket 76.

In the example embodiment, the check strap 78 generally includes a proximal end 98 and an opposite distal end 100. The proximal end includes a coupling base 102 with an arm or shaft 104 extending outwardly therefrom. The coupling base 102 is generally cylindrical and defines a receiving aperture 106 to receive the pin 96 to secure the check strap proximal end 98 between the strap flanges 88. The shaft 104 defines a first detent 108 configured to hold the door 18 stationary in a first predefined position when in the closed or substantially closed position. The distal end 100 includes a detent body 110 coupled to the shaft 104. As shown in FIG. 5, detent body 110 defines a second detent 112 and a third detent 114. The second detent 112 is configured to hold the door 18 in a second predefined position such as, for example, a 30° rotation relative to the side of the vehicle 10. Similarly, the third detent 114 is configured to hold the door 18 in a third predefined position such as, for example, a 45° rotation relative to the side of the vehicle 10. It will be appreciated, however, that check strap 78 may have any suitable number of detents for holding door 18 in various desired rotational positions.

As described above, in the example embodiment, check strap assembly 22 includes stop pin 80 and retaining clip 82. Stop pin 80 is coupled to and projects outwardly from vehicle body 12. As shown in FIG. 5, stop pin 80 provides a positive stop to engage bracket 76 and prevent further rotation thereof. In this orientation, the bracket 76 is located in the transverse deployed position such that check strap 78 extends outwardly from the vehicle body 12 and is disposed for coupling with the door detent 52. Moreover, a biasing mechanism 116 (e.g., a spring) is operably coupled about pin 96 between the bracket 76 and check strap 78. The biasing mechanism 116 is configured to bias the check strap 78 into a predetermined install position, which when the door 18 is being reattached to the vehicle body 12, allows the door 18 to be rotated toward the closed position and automatically re-engage the check strap 78 and the door detent 52. As such, biasing check strap 78 to the predetermined install position facilitates speeding up the door installation process.

When door 18 is removed and the check strap assembly 22 is no longer needed, the check strap 78 is biased to the install position, as noted above. However, with the door 18 removed, the check strap 78 may be in an undesirable position that could hinder the ingress/egress of passengers or make the check strap assembly 22 more likely to be damaged. Accordingly, to stow the check strap assembly 22 out of the way, the bracket 76 is rotated a predetermined distance (e.g., 90° counterclockwise as shown in FIG. 5) into the vertical stowed position. As shown in FIG. 6, the check strap 78 can then be rotated toward the vehicle body 12 against the biasing force of biasing mechanism 116 and subsequently secured in the position by the retaining clip 82.

In one example removal/installation operation, the removable door 18 begins in the closed position, rotatably coupled to the vehicle body 12 by the hinge assemblies 20. The check strap assembly 22 is operably coupled to the door detent 52, and the soft check strap 38 is secured to the hook 46. Beginning with the removal operation, the door 18 is opened and moves through the first detent 108, second detent 112, and third detent 114. The soft check strap 38 is uncoupled from the hook 46 before the door 18 reaches the maximum allowable rotation allowed by the soft check strap 38 (e.g., 90° relative to the side of the vehicle). As shown in FIG. 4, this enables the door 18 to continue rotating until the check strap 78 disengages the door detent 52 and is withdrawn from the check strap aperture 50, for example, at a 100° rotation relative to the side of the vehicle.

Once uncoupled from the check strap assembly 22, the door 18 can be lifted such that hinge assembly door pins 66 are withdrawn out of the first knuckle receiving apertures 72, thereby disconnecting the door 18 from the vehicle body 12. The removable door 18 may then be moved to storage. With the door 18 removed, the check strap assembly 22 remains in the deployed position (FIG. 5) with the bracket 76 oriented in the transverse position and the check strap 78 biased to the install position by the biasing mechanism 116. The check strap assembly 22 is subsequently moved to the stowed position by rotating the bracket 76 counterclockwise (as shown in FIG. 5) to the vertical position (FIG. 6) and forcing the check strap 78 toward the retaining clip 82 to be retained thereby in the stowed position. Thus, the door 18 is quickly and easily removed and the check strap assembly 22 stowed without requiring any tools.

To perform the installation operation of door 18, the bracket 76 is rotated clockwise (as shown in FIG. 6) to the transverse position where it is prevented from further rotation by the stop pin 80. This movement uncouples the check strap 78 from the retaining clip 82, and the biasing mechanism 116 biases the check strap 78 to the install position shown in FIG. 5. The door 18 is then positioned relative to the vehicle body 12 in an orientation greater than the check strap disengagement angle 'α' (e.g., greater than 100°), for example, as shown in FIGS. 1 and 4. The hinge assembly door pins 66 are then aligned with the first knuckle receiving apertures 72 and subsequently inserted into the first knuckles 62 to attach the hinge assemblies 20. The door 18 is then rotated toward the closed position.

As noted above, the stop pin 80 and the biasing mechanism 116 position the check strap assembly 22 for automatic re-engagement between the check strap assembly 22 and the door detent 52. As the door 18 is rotated to the closed position, the check strap 78 is aligned for automatic insertion through the check strap aperture 50 and into the door detent 52. Once the check strap 78 is re-engaged with the door detent 52, the door 18 is rotated to a further predetermined position (e.g., 50° relative to the side of the vehicle) and the soft check strap 38 is reattached to the hook 46, thereby quickly and easily completing the reinstall without any tools.

Described herein are systems and methods for a removable vehicle door system that requires little or no tools to remove the vehicle doors. The systems include a check strap assembly that is automatically detached from a door detent when the door is rotated to a predetermined angle, thereby allowing the door to be lifted out of hinge assemblies and removed from the vehicle. The check strap assembly is then rotated into a stowed position and secured out of the way.

When reinstallation of the doors is desired, the check strap assembly is rotated to the deployed position, the door is reattached to the hinge assemblies, and then rotated to the closed position. During the close, the check strap assembly is automatically positioned and guided for re-engagement with the door detent. As such, the system enables rapid removal and installation of vehicle doors without the need for tools.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A stowable check strap assembly for a vehicle having a body and a removable door, the assembly comprising:
    a bracket configured to rotatably couple to the vehicle body; and
    a check strap rotatably coupled to the bracket and configured to be operably and removably coupled with a door detent coupled to the removable door,
    wherein the bracket is rotatable between a deployed position where the check strap is positioned to extend outwardly from the vehicle body and engage the door detent, and a stowed position where the check strap is positioned to be and is rotated toward the vehicle body for stowage thereof.

2. The assembly of claim 1, further comprising a biasing mechanism configured to bias the check strap into an installation position to guide the check strap back into the door detent when the door is reinstalled on the vehicle body.

3. The assembly of claim 1, further comprising a stop pin configured to couple to the vehicle body and stop rotation of the bracket once in the deployed position.

4. The assembly of claim 1, further comprising a retaining clip configured to couple to the vehicle body to retain the check strap in the stowed positioned toward the vehicle body.

5. The assembly of claim 1, wherein the bracket includes a base member with a pair of laterally spaced apart strap flanges extending therefrom,
    wherein one end of the check strap is disposed between the strap flanges and rotatably coupled thereto.

6. The assembly of claim 5, wherein the bracket further includes a pin rotatably coupling the check strap to the strap flanges.

7. The assembly of claim 1, wherein the bracket includes a base member with a fastener flange extending therefrom, the fastener flange defining a fastener aperture configured to receive a fastener for rotatably coupling the bracket to the vehicle body.

8. The assembly of claim 1, wherein the check strap includes a distal end having a plurality of detents formed therein configured to facilitate holding the door in a plurality of predefined positions relative to the vehicle body.

9. A vehicle comprising:
    a body;
    a removable door removably and rotatably coupled to the vehicle body;
    a door detent coupled to the removable door; and
    a stowable check strap assembly configured to be operably coupled to the door detent, wherein the check strap assembly is movable between a deployed position where the check strap assembly is positioned to extend outwardly from the vehicle body and engage the door detent, and a low-profile stowed position once the check strap assembly is detached from the door detent, wherein the stowable check strap assembly comprises:
        a bracket rotatably coupled to the vehicle body; and
        a check strap rotatably coupled to the bracket and configured to be operably and removably coupled with the door detent,
        wherein the bracket is rotatable between the deployed position where the check strap is positioned to extend outwardly from the vehicle body and engage the door detent, and the stowed position where the check strap is positioned to be rotated toward the vehicle body for stowage thereof.

10. The vehicle of claim 9, wherein the check strap assembly further comprises a biasing mechanism configured to bias the check strap into an installation position to guide the check strap back into the door detent when the door is reinstalled on the vehicle body.

11. The vehicle of claim 9, wherein the check strap assembly further comprises a stop pin coupled to the vehicle body and configured to stop rotation of the bracket once in the deployed position.

12. The vehicle of claim 9, wherein the check strap assembly further comprises a retaining clip coupled to the vehicle body and configured to retain the check strap in the stowed positioned toward the vehicle body.

13. The vehicle of claim 9, wherein the bracket includes a base member with a pair of laterally spaced apart strap flanges extending therefrom,
    wherein one end of the check strap is disposed between the strap flanges and rotatably coupled thereto.

14. The vehicle of claim 13, wherein the bracket further includes a pin rotatably coupling the check strap to the strap flanges.

15. The vehicle of claim 13, wherein the bracket further includes a fastener flange extending from the base member, the fastener flange defining a fastener aperture configured to receive a fastener for rotatably coupling the bracket to the vehicle body.

16. The vehicle of claim 9, wherein the check strap includes a distal end having a plurality of detents formed therein configured to facilitate holding the door in a plurality of predefined positions relative to the vehicle body.

17. The vehicle of claim 9, further comprising:
    a hook coupled to the vehicle body; and
    a soft check strap having a first end coupled to the door, and an opposite second end configured to removably couple to the hook to limit rotation of the door relative to the vehicle body.

* * * * *